Figures 1, 2:
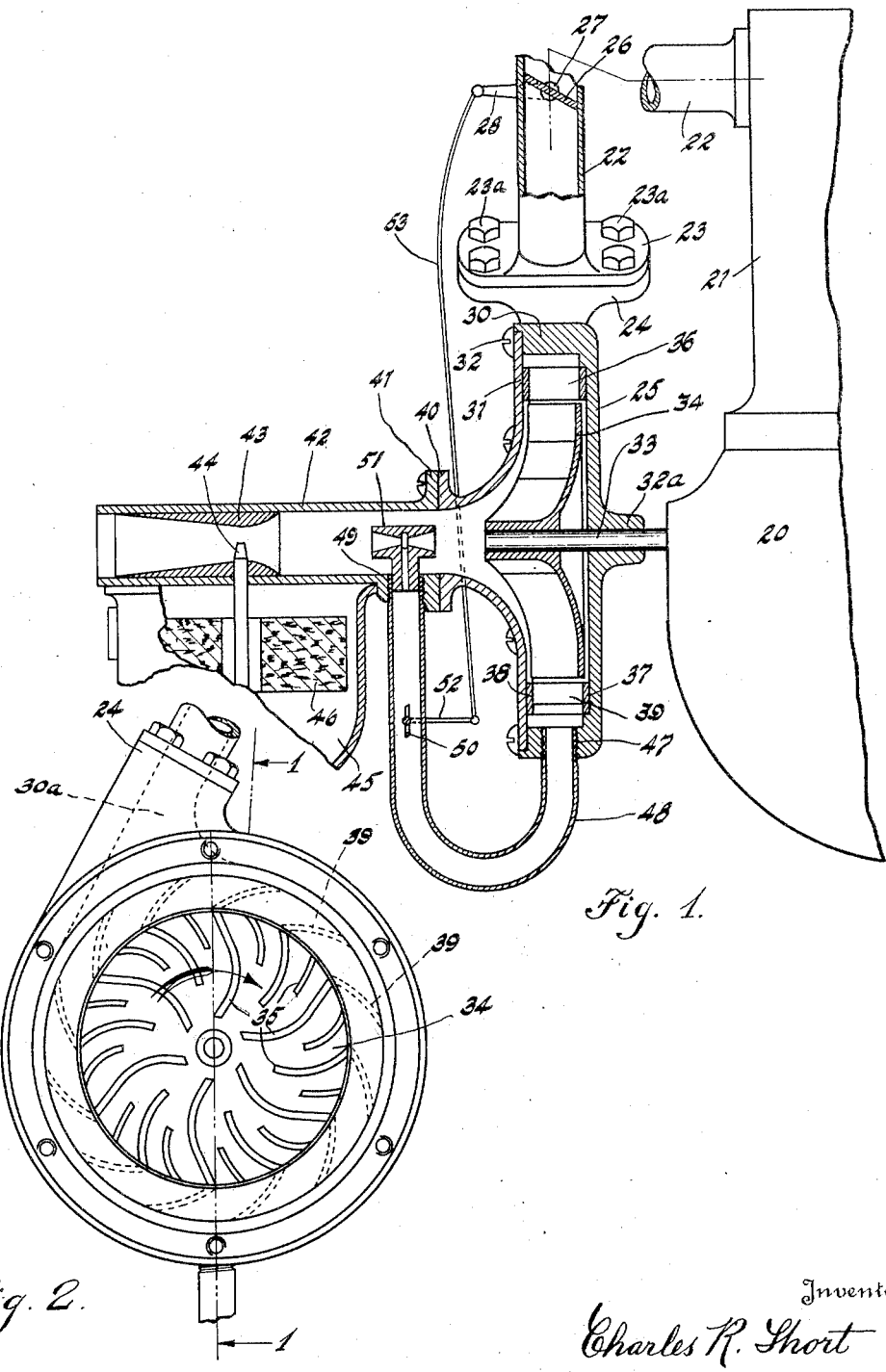

May 14, 1929.  C. R. SHORT  1,712,941

FUEL CONTROL DEVICE

Filed June 3, 1926

Inventor
Charles R. Short
By Blackmore, Spencer & Hull
Attorneys

Patented May 14, 1929.

1,712,941

UNITED STATES PATENT OFFICE.

CHARLES R. SHORT, OF DAYTON, OHIO, ASSIGNOR TO GENERAL MOTORS RESEARCH CORPORATION, OF DETROIT, MICHIGAN, A CORPORATION OF DELAWARE.

FUEL-CONTROL DEVICE.

Application filed June 3, 1926. Serial No. 113,487.

This invention relates to improvements in fuel supply devices for internal combustion engines, and more particularly to means for collecting and recirculating the unvaporized fuel particles not entrained in the air flow when the velocity is low.

At high engine speeds the velocity of the air passing the carbureter nozzle is sufficiently high to atomize to such degree that the fuel particles are entrained in the air flow and carried into the engine, but during reduced speeds, or partially closed throttle conditions, the velocity of the air flow past the nozzle is not sufficient to fully atomize the fuel to the same degree, and the larger particles separate from the flow and are deposited on the walls of the passageway.

The object of the invention is to collect such deposited particles and reintroduce them into the air flow, thereby enabling a more perfect diffusion of the fuel and air, resulting in proper distribution and smooth engine operation.

A further object is to provide means for automatically controlling the device in accordance with the volume of fuel entering the engine cylinder.

Further objects and advantages of the present invention will be apparent from the following description, reference being had to the accompanying drawings wherein a preferred form of embodiment of the present invention is clearly shown.

In the drawings,

Fig. 1 is a fragmentary view of the fuel supply device, a portion thereof being shown in section taken along the line 1—1 of Fig. 2; and Fig. 2 is a fragmentary detailed view of the pressure means with its cover removed in order to show the rotor more clearly.

Referring to the drawings, the internal combustion engine designated by 20 includes a cylinder 21 to which is attached the intake pipe or conduit 22. Its one extremity is provided with a flange 23 which is adapted to be secured to a corresponding flange 24 formed integral with the rotor housing 25 by means of studs 23ª. In the intake conduit 22 there is provided a throttle valve 26 shown in closed position in Fig. 1, said valve being mounted on a stem 27 which extends through the walls of the intake conduit 22 and has a lever 28 attached to one end thereof.

The rotor housing 25 is shown cup-shaped having an annular side wall 30 recessed to receive a cover 31 which is held in position on the housing 25 by means of screws 32. The annular side wall 30 has an apertured neck connecting the rotor housing and flange 23, said aperture forming a channel 30ª which provides communication between the intake conduit 22 and the interior of the housing 25. The housing 25 is secured to the engine in any suitable manner not shown. It has a central flange or extension 32ª formed thereon which is apertured to form a bearing for the shaft 33 which extends from the body and is suitably driven at a speed approximately five to ten times engine speed. The shaft 33 extends into the housing 25 and has mounted thereon the rotor 34 which includes a plurality of blades 35 so arranged that when the rotor is operated it will cause circulation of the fluid in the housing 25.

Surrounding the rotor 34 and secured in the housing 25 in any suitable manner is a diffuser 36 which comprises two rings 37 and 38 between which are mounted a plurality of diffuser vanes 39. These vanes are so arranged relative to the rotor that when the rotor is operated and circulating fluid, the vanes will convert the velocity of said fluid into some greater pressure in the housing 25.

Surrounding the mouth of the cover 31 there is a flange 40 adapted to have connected thereto a corresponding flange 41 of fuel mixture conduit 42 which communicates with the mouth of the cover 31, thereby forming communication with the interior of the housing 25 and consequently with the intake conduit 22. Inside the fuel mixture conduit 42 there is provided a venturi 43, which, at its restricted throat portion, has a nozzle 44 extending therein, the other end of said nozzle 44 extending downwardly into the fuel bowl 45 in which there is provided a float 46 for controlling the level of the fuel in the bowl. Any suitable fuel supply intake pipe may be connected to the float bowl 45, the float element 46 controlling the inlet of the fuel into the said bowl in accordance with the level of the fuel in the bowl. It is to be understood that any suitable form of carbureter may be employed, the particular form shown being for illustrative purposes only.

An aperture 47 is provided in the side wall 30 of the housing 25, preferably in the bottom thereof, where the condensed fluid will have a natural tendency to collect, and is screw threaded to receive the end of the by-pass pipe 48, the opposite end of which extends into an aperture 49 formed in the fuel mixture conduit 42 in front of the mouth of the housing cover 31. In this by-pass pipe 48 there is provided a butterfly valve 50 carried on a valve stem which extends through the walls of the pipe 48 and has a lever 52 secured to its one end. A connecting link 53 connects the lever 52 of the butterfly valve 50 and the lever 28 of the throttle valve 26 in such a manner that when the throttle valve 26 is closed the butterfly valve is wide open and when the connecting link 53 is operated to open the throttle valve valve 26 the butterfly valve will move toward its closed position.

When the engine is operating at part throttle or comparatively low speed, the rotor 34 operating at substantially from five to ten times the speed of the engine will create a suction in the fuel mixture conduit 42, causing air to enter the open end of the conduit. As this air passes through the venturi 43 its velocity will be increased, thereby causing fuel to be drawn from the nozzle 44 which communicates with the fuel bowl 45, said fuel being carried with the air into the rotor housing 25. The rotor will circulate and force this fuel and air mixture through the diffuser 36 and varying amounts under pressure through passage 30ᵃ into the intake conduit 22 dependent upon the throttle opening. The proper amount of fuel mixture for engine requirements will be forced past the part open throttle valve 26 through the remaining portion of the intake conduit 22 in the engine cylinder.

At this low speed the fuel requirement for the engine will be small, and the velocity of the air insufficient to fully atomize the fuel particles. These particles, therefore, cling to the walls of the passage and rotor housing and fall to the bottom. The by-pass 48 is provided to receive such unconditioned fuel particles, as well as a small amount of the air flow, and leads back to the mixture conduit 42, and the butterfly valve 50 in the by-pass 48 controls the flow therethrough. To facilitate the reintroduction of such particles, the hollow head 51 is inserted in the top of the by-pass extending into the mixture conduit 42 and presents a restricted passageway at the end of the by-pass 48 leading into the hollow head. An annular groove is provided in the hollow head at the entrance of the restricted by-pass passage onto which the fuel particles cling until they are again drawn or atomized into the fuel mixture flowing through the mixture conduit 42.

When the throttle 26 is operated at wider open position, the butterfly valve 50 will correspondingly be moved to a more fully closed position, thus permitting more fuel mixture to be forced into the intake conduit 22 and less to be by-passed through the pipe 48. Since at high speed the velocity of the mixture is sufficient to atomize all the fuel particles, the necessity for the by-pass is obviated, and by thus closing the valve 50 the effect of the rotor is more fully concentrated to force fuel into the cylinder at a time when greater force is required to send the necessarily heavier charge into the cylinder.

The levers 28 and 52 of the throttle valve 26 and butterfly valve 50 respectively may be operated by a single throttle valve or accelerator, or the butterfly valve 50 may be operated separately. It is preferable, however, to operate the two by means of a common operating element so that the one will be opened or closed with the closing or opening of the other respectively.

The invention has been shown and described throughout the specification in connection with a force feed device. However, there is no intention to limit the invention to the exact details shown, but it is to be understood that the device may also be used in connection with other types of fuel supply devices, including the typical engine suction type, wherein the same conditions exist.

While the form of embodiment of the present invention as herein disclosed constitutes a preferred form, it is to be understood that other forms might be adopted, all coming within the scope of the claims which follow.

I claim:

1. A device of the character described including in combination, a fuel mixture conduit leading to an engine cylinder, an impeller located within said conduit, a by-pass pipe leading from a point adjacent the impeller back to the conduit in advance of the impeller to return under influence of the impeller, precipitated fuel particles to the incoming fuel stream, and means to close said by-pass against the flow of fuel particles at predetermined engine speeds, to concentrate the influence of said impeller on the delivery of fuel mixture thru said conduit to the engine cylinder.

2. A device of the character described including in combination a fuel mixture conduit leading to an engine cylinder, a rotary impeller in the conduit, a throttle valve controlling delivery of fuel mixture to the cylinder located beyond said impeller, a by-pass leading from a point adjacent the impeller back to the conduit in advance of the impeller, through which a portion of the fuel mixture under pressure may be diverted to return precipitated fuel particles to be returned to the fuel conduit for suspension in the incoming fuel mixture, a valve associated with said by-pass, and a connection between said valve and the throttle valve, whereby the diversion of fuel mixture is diminished as the throttle valve is opened.

In testimony whereof I affix my signature.

CHARLES R. SHORT.